(12) United States Patent
Hara (10) Patent No.: US 8,711,066 B2
(45) Date of Patent: Apr. 29, 2014

(54) IMAGE DISPLAY DEVICE AND DISPLAY UNIT FOR IMAGE DISPLAY DEVICE

(75) Inventor: Zenichirou Hara, Tokyo (JP)

(73) Assignee: Mitsubishi Electric Corporation, Chiyoda-Ku, Tokyo (JP)

( * ) Notice: Subject to any disclaimer, the term of this patent is extended or adjusted under 35 U.S.C. 154(b) by 626 days.

(21) Appl. No.: 12/370,332

(22) Filed: Feb. 12, 2009

(65) Prior Publication Data

US 2009/0213036 A1    Aug. 27, 2009

(30) Foreign Application Priority Data

Feb. 25, 2008  (JP) ................................ 2008-042988
Sep. 4, 2008   (JP) ................................ 2008-227155

(51) Int. Cl.
*G09G 3/32* (2006.01)

(52) U.S. Cl.
USPC ................... 345/83; 345/4; 345/87; 345/694

(58) Field of Classification Search
USPC .................. 345/4, 83, 87, 589, 694
See application file for complete search history.

(56) References Cited

U.S. PATENT DOCUMENTS

| | | | |
|---|---|---|---|
| 6,078,307 A | | 6/2000 | Daly |
| 6,443,597 B1 * | | 9/2002 | Natori ............................ 362/304 |
| 6,486,923 B1 * | | 11/2002 | Maeshima et al. ............. 348/649 |
| 6,741,385 B2 * | | 5/2004 | Ikeda et al. ..................... 359/296 |
| 6,950,115 B2 * | | 9/2005 | Brown Elliott ................. 345/694 |
| 7,274,383 B1 | | 9/2007 | Brown |
| 7,688,335 B2 * | | 3/2010 | Brown Elliott et al. ........ 345/613 |
| 7,889,215 B2 * | | 2/2011 | Brown Elliott et al. ........ 345/690 |
| 2002/0015110 A1 | | 2/2002 | Brown Elliott |
| 2002/0036606 A1 * | | 3/2002 | Ichikawa et al. ................. 345/87 |
| 2002/0050865 A1 | | 5/2002 | Gitsevich et al. |
| 2002/0075288 A1 | | 6/2002 | Matsumura et al. |
| 2003/0016198 A1 * | | 1/2003 | Nagai et al. ...................... 345/83 |
| 2003/0034992 A1 | | 2/2003 | Brown Elliott et al. |
| 2003/0085906 A1 * | | 5/2003 | Elliott et al. .................... 345/613 |
| 2003/0090581 A1 | | 5/2003 | Credelle et al. |

(Continued)

FOREIGN PATENT DOCUMENTS

| | | |
|---|---|---|
| JP | 10-161569 A | 6/1998 |
| JP | 11-185654 A | 7/1999 |

(Continued)

OTHER PUBLICATIONS

Search Report in corresponding Application No. BE 200900092 dated Jun. 4, 2009.

(Continued)

*Primary Examiner* — Premal Patel
(74) *Attorney, Agent, or Firm* — Buchanan Ingersoll & Rooney PC (57) ABSTRACT

To provide an image display device in which the number of pixels of arranged light emitting elements or the like can be reduced and the cost can be drastically reduced while image degradation is minimized, and a display unit used therefor. In an image display device in which plural display units including pixels formed by light emitting elements or the like are arranged in a plane, the display unit is configured by two-dimensionally arranging lattice-shaped pixel groups formed by providing pixels in locations corresponding to three lattice points of a square lattice, respectively, and forming a space area in which no pixel exists in a location corresponding to the remaining lattice point.

8 Claims, 10 Drawing Sheets

(56) References Cited

U.S. PATENT DOCUMENTS

| | | | |
|---|---|---|---|
| 2003/0103058 A1* | 6/2003 | Hellen Brown Elliott et al. | 345/589 |
| 2003/0138574 A1* | 7/2003 | Tanaka et al. | 428/1.6 |
| 2004/0046714 A1 | 3/2004 | Brown Elliott | |
| 2004/0130512 A1 | 7/2004 | Nakanishi | |
| 2005/0248262 A1 | 11/2005 | Brown Elliott | |
| 2006/0232525 A1* | 10/2006 | Chou | 345/83 |
| 2007/0109331 A1 | 5/2007 | Brown Elliott et al. | |
| 2007/0206013 A1 | 9/2007 | Brown Elliott et al. | |
| 2007/0257944 A1* | 11/2007 | Miller et al. | 345/694 |
| 2007/0279314 A1 | 12/2007 | Brown | |
| 2008/0143916 A1* | 6/2008 | Fujino et al. | 349/58 |
| 2008/0158243 A1* | 7/2008 | Brown Elliott et al. | 345/589 |
| 2009/0167788 A1* | 7/2009 | Lin et al. | 345/690 |
| 2010/0231804 A1* | 9/2010 | Hisakawa | 348/725 |

FOREIGN PATENT DOCUMENTS

| | | |
|---|---|---|
| JP | 3702699 A | 10/2000 |
| JP | 2001-075508 A | 3/2001 |
| JP | 3416570 A | 11/2002 |
| JP | 2004-184530 A | 7/2004 |
| JP | 2004-530924 A | 10/2004 |
| JP | 2006-064861 A | 3/2006 |
| JP | 2006-292858 A | 10/2006 |
| WO | WO 2005/071471 | 8/2005 |

OTHER PUBLICATIONS

Office Action from the Japan Patent Office dated Oct. 1, 2013, issued in corresponding Japanese Patent Application No. 2013-009777, with English translation thereof. (pp. 7 pages).

* cited by examiner

-- Prior Art --

FIG.25
LIGHT EMISSION

FIG.26

IMAGE DISPLAY DEVICE AND DISPLAY UNIT FOR IMAGE DISPLAY DEVICE

BACKGROUND OF THE INVENTION

1. Field of the Invention

The present invention relates to an image display device including light emitting elements such as LEDs arranged in a plane and a display unit used therefore.

2. Description of the Related Art

A large image display device in a related art includes many display units containing light emitting elements arranged in a plane. Recently, LEDs (light emitting diodes) have become main stream of light emitting elements because the layout and arrangement pitch of LEDs of three primary colors can be arbitrarily designed. Accordingly, large image display devices having various resolution and brightness can be formed depending on the intended use.

The display units of the large image display device include pixels or picture elements containing subpixels of the respective colors of at least R (red), G (green), B (blue) arranged in a square lattice for display of full-color video (in the following description, the term "subpixel" is used to mean the same thing as an individual light emitting element).

Further, R, G, B are assigned to three pixels of four (2×2) pixels, and an appropriate color is assigned to the remaining fourth pixel depending on the intended use. For example, G has been assigned to the fourth pixel in a large image display device in which CRTs or discharge tubes are arranged, and R has been assigned thereto in a device in which LEDs are arranged (see Japanese Patent No. 3702699). Lately, there is an example that W (white) is assigned as a pixel configuration of an organic EL or the like, for example (see Japanese Patent No. 3416570).

Especially, recently, an LED device called 3-in-1 having LED chips of three colors of R, G, B in one LED lamp have been emerged. When such 3-in-1 type LED devices are arranged, one pixel emits three primary colors, and the three colors become easier to be mixed than in the system in which three LEDs of R, G, B are arranged. Accordingly, the visual distance at which a viewer watches an image becomes shorter. As the 3-in-1 type LED device arrangement, there is a system as disclosed in JP-A-2001-75508.

In this type of large image display device, it is necessary to arrange pixels in higher density with a smaller pixel pitch as the resolution becomes higher. Accordingly, in a high resolution large image display device including arranged LEDs, for example, the number of LEDs per unit area increases and the cost becomes higher. Especially, in the use of high-quality image display with high-definition contents like "Hi-Vision", there is a problem that the arrangement density of LEDs becomes higher and the cost dramatically increases.

SUMMARY OF THE INVENTION

The invention has been achieved to solve the above described problem. A purpose of the invention is to provide an image display device in which the number of pixels of arranged light emitting elements or the like can be reduced and the cost can be drastically reduced while image degradation is minimized, and a display unit used therefore.

In an image display device in which plural display units are arranged in a plane, the display unit is configured by two-dimensionally arranging lattice-shaped pixel groups formed by providing pixels in locations corresponding to three lattice points of a square lattice, respectively, and forming a space area in which no pixel exists in a location corresponding to the remaining lattice point.

According to the invention, an image display device in which the number of pixels of arranged light emitting elements or the like can be reduced and the cost can be drastically reduced while image degradation is minimized, and a display unit used therefore can be obtained.

The foregoing and other object, features, aspects, and advantages of the present invention will become more apparent from the following detailed description of the present invention when taken in conjunction with the accompanying drawings.

DETAILED DESCRIPTION OF THE INVENTION

Embodiment 1

Figure 1:
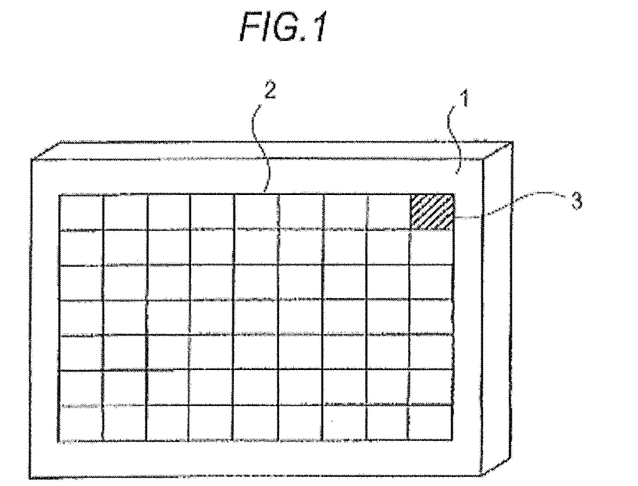
FIG. 1 is a schematic explanatory diagram of a large image display device as a target of the invention.

FIG. 1 is a schematic explanatory diagram of a large image display device as a target of the invention.

In FIG. 1, a display part 2 of the large image display device 1 includes plural display units 3 arranged in a plane. Each display unit 3 is configured by two-dimensionally arranging many pixel groups in which pixels are arranged in a square-lattice manner.

Figure 2:
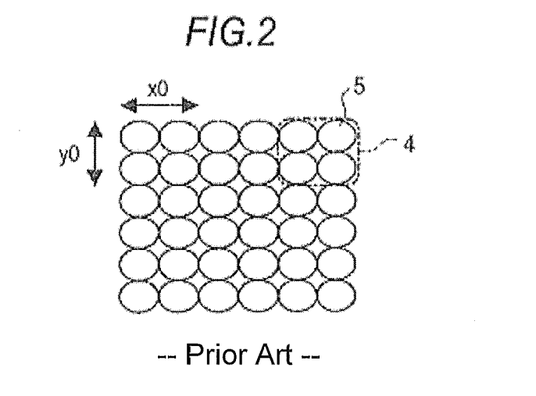
FIG. 2 is an explanatory diagram showing pixel arrangement of a conventional display unit.
Figure 3:
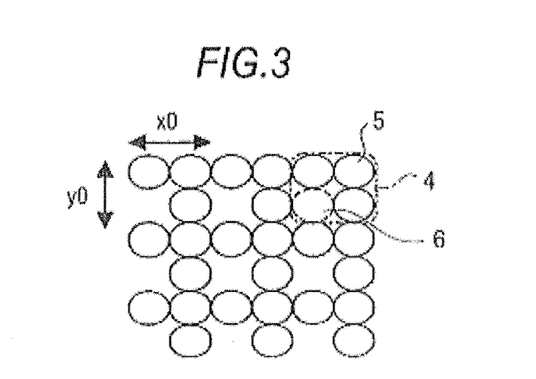
FIG. 3 is an explanatory diagram showing pixel arrangement of a display unit in embodiment 1 of the invention.

FIGS. 2 and 3 are explanatory diagrams showing a conventional display unit and pixel arrangement of the display unit according to embodiment 1 of the invention. While one set of pixel group 4 is formed by arranging each pixel 5 of four (2×2) pixels at each lattice point of a square lattice in FIG. 2, one pixel is removed from four (2×2) pixels forming a square lattice and the rest three pixels configure one set of pixel group 4 in FIG. 3. That is, in FIG. 3, one set of pixel group 4 is configured by respectively arranging the pixels 5 in the locations corresponding to three lattice points of the square lattice and forming a space area 6 in which no pixel exists in a location corresponding to the remaining lattice point.

As below, a concept of resolution in an image display device to which the invention is applied will be described.

Figure 4:
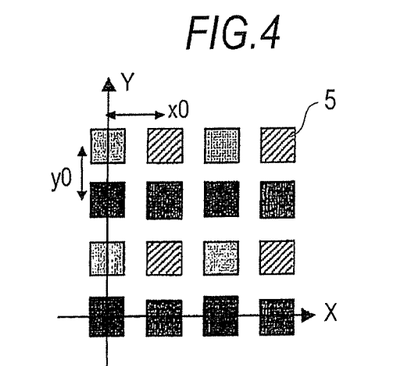
FIG. 4 is an explanatory diagram showing pixel arrangement in which pixels are arranged in a square lattice manner.
Figure 5:
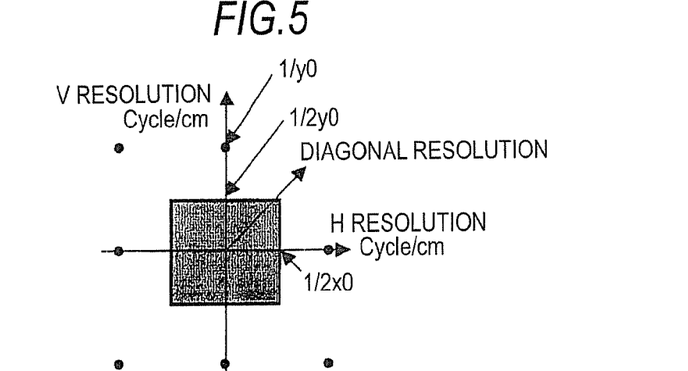
FIG. 5 is an explanatory diagram showing resolution according to the pixel arrangement in FIG. 4.
Figure 6A:
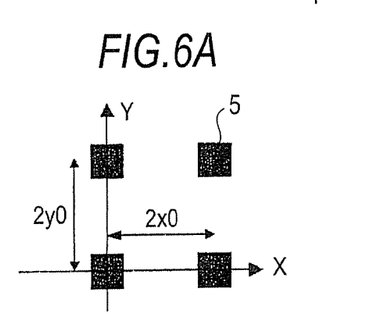
FIGS. 6A to 6D are separate charts by separating the pixel arrangement in FIG. 4 corresponding to four lattices.
Figure 6B:
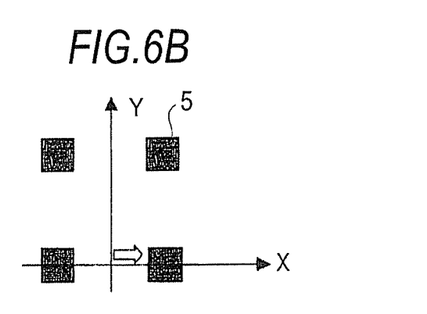
Figure 6C:
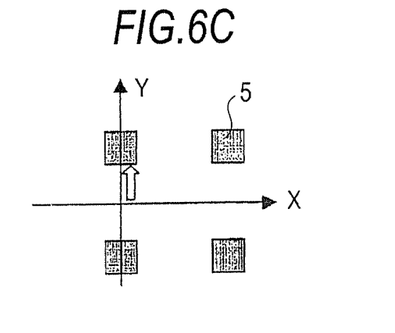
Figure 6D:
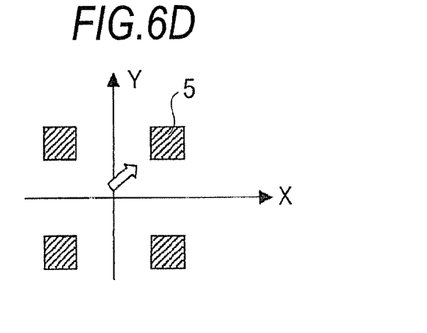
Figure 7:
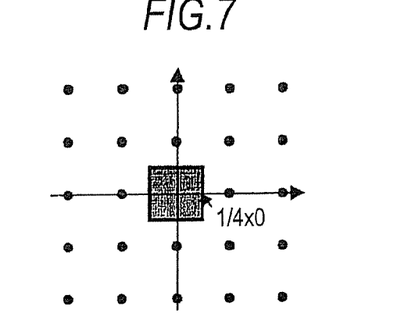
FIG. 7 is an explanatory diagram showing resolution according to the separated pixel arrangements in FIGS. 6A to 6D.

For convenience of explanation, assuming that a pixel group 4 forming a basic square lattice in FIG. 2 is separated into four lattices of A, B, C, D corresponding to the respective lattice points, FIGS. 4, 5 are introduced. FIG. 4 is a combined chart of the four lattices of A, B, C, D, and FIG. 5 is an explanatory diagram showing the resolution thereof.

In FIG. 4, when the horizontal (H) sampling frequency corresponds to pixel pitch x0 (y0 in the vertical (V) direction), the restorable maximum frequency is expressed by 1/2x0, and similarly, the restorable maximum frequency is expressed by 1/2y0 in the vertical direction. FIG. 5 two-dimensionally shows the relationship.

FIGS. 6A to 6D, 7 are explanatory diagrams of four lattices of A, B, C, D and an explanatory diagram showing resolution of the respective lattices. These four lattices are equal in pixel arrangement but different in phase, and have the same resolution. When the respective two kinds of lattices are combined, pixel arrangements as in FIGS. 8A, 8B, 8C are formed and the display unit 3 are configured by arranging a lot of the pixels in a lattice form.

Figure 8A:
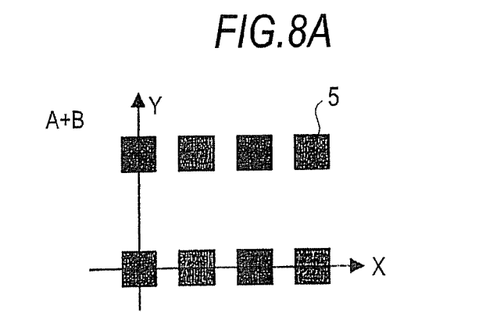
FIG. 8 is an explanatory diagram showing pixel arrangement formed by combining the separated pixel arrangements in FIGS. 6A to 6D.
Figure 8B:
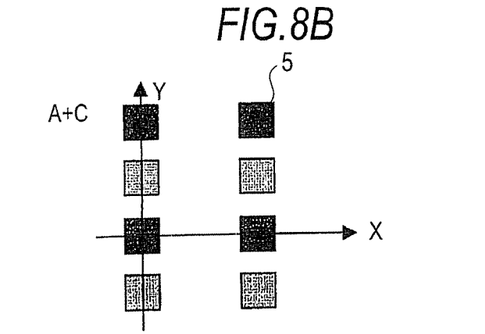
Figure 8C:
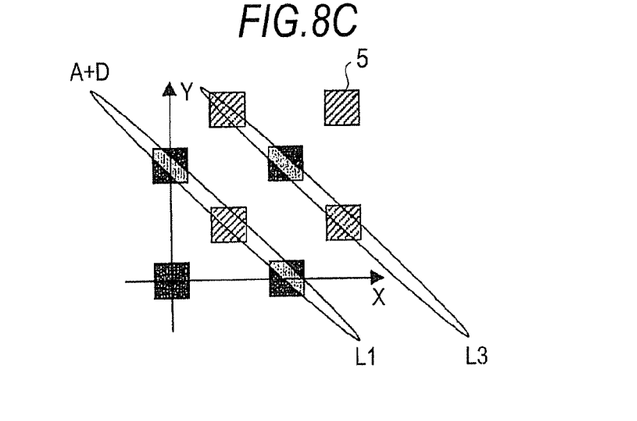
Figure 9A:
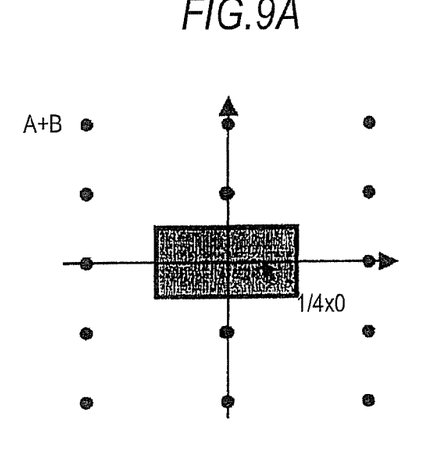
FIGS. 9A to 9C are explanatory diagrams showing resolution according to the combined pixel arrangement in FIG. 8.
Figure 9B:
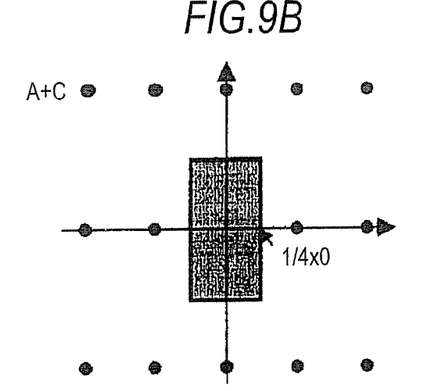
Figure 9C:
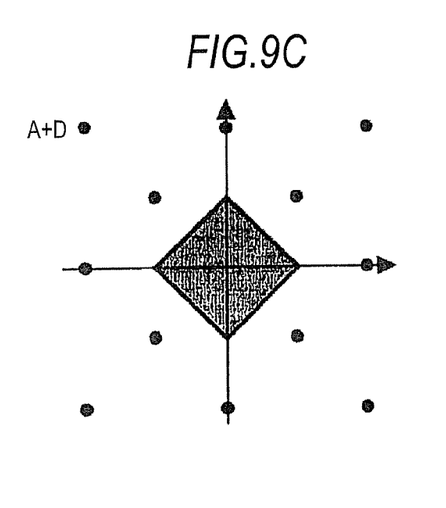

The respective resolution is expressed corresponding to the respective pixel arrangements of FIGS. 8A, 8B, 8C and have the following features.

I. A+B: pixels in the horizontal direction are interpolated and the horizontal resolution is improved to twice that of A.

II. A+C: pixels in the vertical direction are interpolated and the vertical resolution is improved to twice that of A.

III. A+D: pixels in the diagonal direction are interpolated and the horizontal resolution and the vertical resolution are improved compared to that of A.

Figure 10:
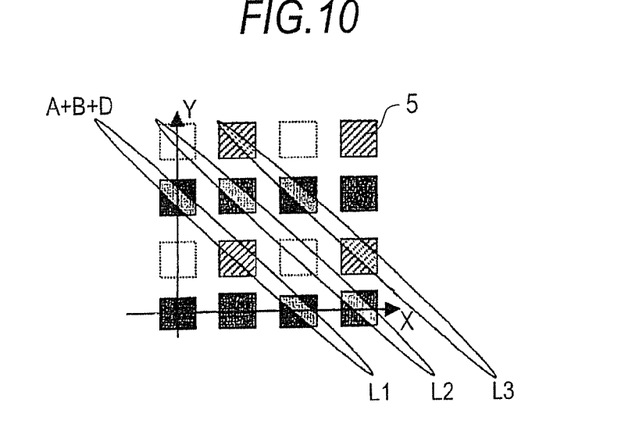
FIG. 10 is a diagram for explanation of resolution according to the pixel arrangement of the display unit in embodiment 1.

The pixel arrangement in FIG. 3 is shown in combination of the four lattices of A, B, C, D as in FIG. 10, for example, as below.

IV. A+B+D

Figure 11:
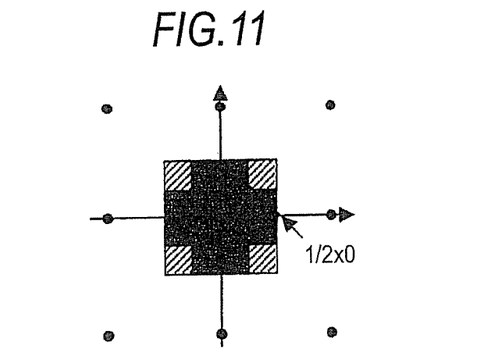
FIG. 11 is an explanatory diagram showing resolution according to the pixel arrangement in FIG. 10.

Regarding the resolution of IV, the lattices of the above described I, II, III are combined and the horizontal resolution and the vertical resolution are improved as in FIG. 11. Further, regarding the diagonal resolution, diagonal components are emerged along the spaces between the diagonal lines of III. For example, in FIG. 8C, diagonal lines L1, L3 can be represented, and, in FIG. 10, diagonal line L2 is represented along the space between the diagonal lines L1, L3 of FIG. 8C and a certain degree of improvement is expected. The certain degree of improvement is shown by shaded areas in FIG. 11. Here, compared to the resolution in FIG. 5, the resolution of the shaded areas may be reduced and the lattice-shaped space areas may be noticeable as noise due to removal of one pixel, however, the horizontal resolution and V resolution are maintained. Further, such reduction in resolution and noise are hard to perceived through observation at an appropriate visual distance.

Furthermore, in moving images, the relationships between pixels relatively change. In FIG. 10, when the diagonal image L1 horizontally moves to L2, L3, for example, information is lost due to removal of pixels at the location of L2, but information is not lost at the location of L3 and the image degradation in still images is further relaxed in moving images.

As described above, according to embodiment 1 of the invention, since the display unit 3 is configured by two-dimensionally arranging lattice-shaped pixels 4 formed by providing pixels 5 in locations corresponding to three lattice points of a square lattice, respectively, and forming a space area 6 in which no pixel exists in a location corresponding to the remaining lattice point, image degradation can be minimized and the cost of display elements forming pixels can be reduced by 25%, and thereby, a low-cost image display device can be reduced.

Embodiment 2

Figure 12:
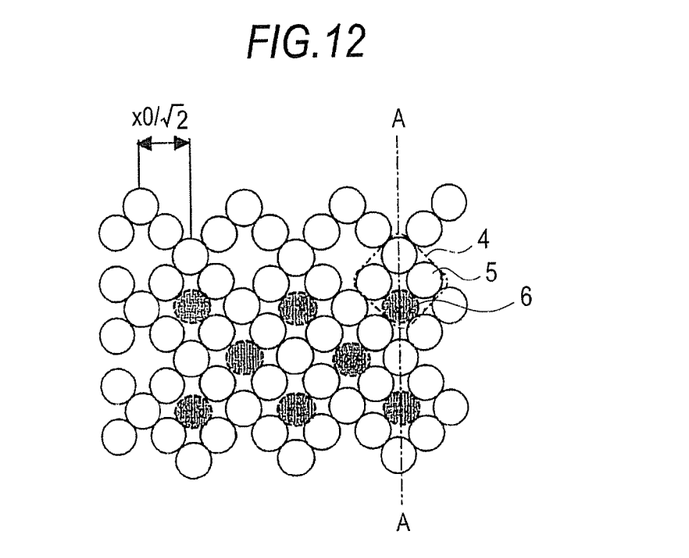
FIG. 12 is an explanatory diagram showing pixel arrangement of a display unit in embodiment 2 of the invention.

FIG. 12 is an explanatory diagram showing pixel arrangement of a display unit 3 in embodiment 2 of the invention, and the pixel groups 4 shown in FIG. 3 are rotated 45° to the left relative to the center point of the square lattices.

In FIG. 2, the space areas 6 formed by removing one pixel from four (2×2) pixels on the square lattice are noticeable as noise in a lattice form, however, in FIG. 12, the pixel groups 4 are rotated 45°, and thereby, the lattice-shaped space areas 6 are in a staggered manner, and the noise becomes less noticeable.

Figure 13:
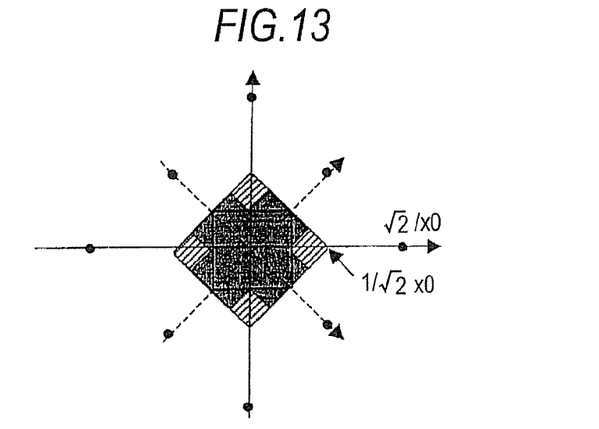
FIG. 13 is an explanatory diagram showing resolution according to the pixel arrangement in FIG. 12.

FIG. 13 is an explanatory diagram showing two-dimensional resolution in FIG. 12. The resolution corresponding to FIG. 12 is obtained by rotating FIG. 11 showing the resolution corresponding to FIG. 3 to 45° and has the same area as FIG. 11. The areas showing the resolution have the same area because the numbers of pixels are the same in FIGS. 3 and 12.

Assuming that the horizontal pixel pitch of FIG. 3 is x0, components reduced to $x0/\sqrt{2}$ appear in horizontal and vertical components in FIG. 12. In FIG. 13, although the resolution of diagonal lines is sacrificed, the horizontal and vertical resolution becomes higher according to the components reduced to $x0/\sqrt{2}$ of the pixel pitch.

Here, in nature of image, generally, the resolution component of diagonal line is insufficient compared to the horizontal and vertical resolution components. Therefore, improvement in horizontal and vertical resolution at the expense of the resolution component of diagonal line makes the apparent resolution of the image being displayed higher and provides improvement in image quality.

As described above, according to embodiment 2 of the invention, since the display unit 3 is configured by two-dimensionally arranging lattice-shaped pixel groups 4 forming by providing pixels 5 in locations corresponding to three pixel points of the square lattice and forming the space area 6 in which no pixel exists in a location corresponding to the remaining lattice point, rotating the pixel groups 4 to 45° relative to the center point of the square lattice, and arranging the pixels 5 in a staggered manner as a whole, the image degradation can be further reduced and the cost reduction of the image display device can be effectively realized.

Embodiment 3

Figure 14:
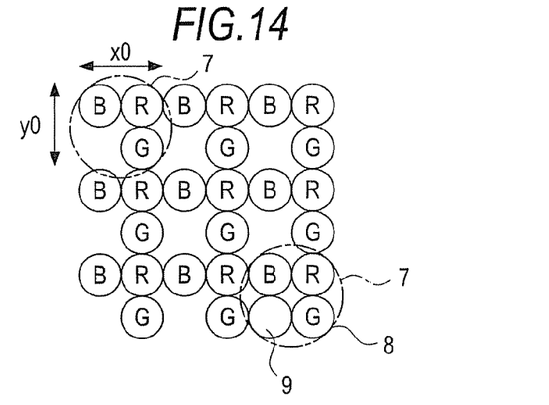
FIG. 14 is an explanatory diagram showing pixel arrangement of each display unit in embodiment 3 of the invention.

FIG. 14 is a schematic explanatory diagram showing pixel arrangement of the display unit 3 in embodiment 3 of the invention. In FIG. 14, a pixel group 7 forming each display unit 3 is formed by providing light emitting elements (subpixels) 8 of three primary colors of R, G, and B such as LEDs in locations corresponding to three lattice points of a square lattice, respectively, and forming a space area 9 in which no light emitting element exists in a location corresponding to the remaining lattice point.

That is, each pixel group 7 is configured as a lattice-shaped pixel group in which the light emitting elements 8 of three primary colors of R, G, and B are assigned only to locations corresponding to three lattice points of the square lattice, and the fourth light emitting element (subpixel) is not provided in the location corresponding to the remaining lattice point.

In the case where the display unit 3 having such pixel groups 7 is used, lattice-shaped space areas 9 may be noticeable as noise. However, such noise is not perceived through observation at an appropriate visual distance, and full-color display can be achieved even when one subpixel is removed because each pixel group 7 contains three-primary colors.

As described above, according to embodiment 3 of the invention, in an image display device in which plural display units including pixels formed by light emitting elements are arranged in a plane, the display unit 3 is configured by two-dimensionally arranging lattice-shaped pixel groups 7 formed by providing light emitting elements 8 of three primary colors of R, G, and B in locations corresponding to three lattice points of a square lattice, respectively, and forming a space area 9 in which no light emitting element exists in a location corresponding to the remaining lattice point. Accordingly, an image display device in which the cost of the light emitting elements forming subpixels can be reduced by 25% and the cost can be drastically reduced while image degradation is suppressed can be realized.

Embodiment 4

Figure 15:
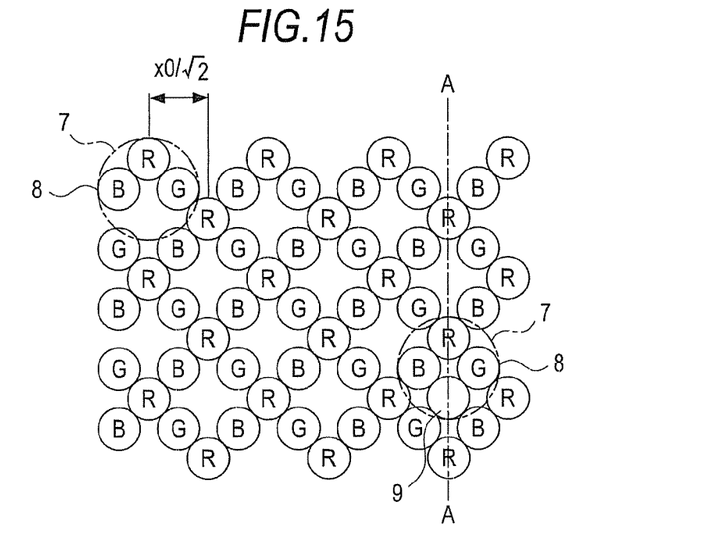
FIG. 15 is an explanatory diagram showing pixel arrangement of each display unit in embodiment 4 of the invention.

FIG. 15 shows pixel arrangement of the display unit in embodiment 4 of the invention, and the pixel groups 7 shown in FIG. 14 are rotated 45° to the left so that the light emitting element 8 of the primary color R may be located on an apex relative to the center point of the square lattice.

That is, the light emitting elements (subpixels) 9 forming the display unit 3 are arranged in a staggered manner as a whole by removing one subpixel from four (2×2) subpixels on the square lattice, assigning the light emitting elements 8 of three primary colors of R, G, and B to the remaining three subpixels, and rotating the pixel groups 7 to 45° relative to the center point of the square lattice.

Figure 16:
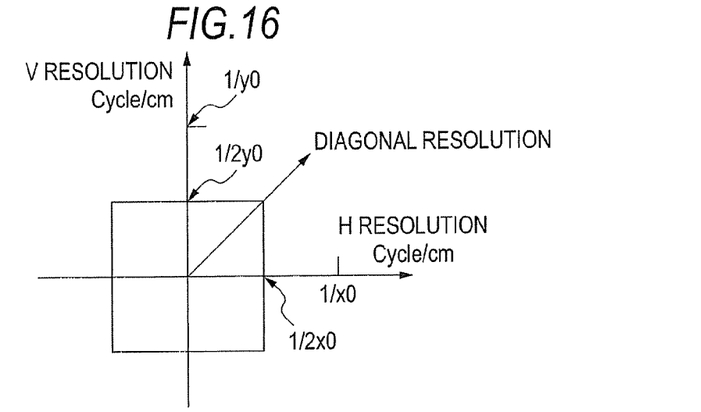
FIG. 16 is an explanatory diagram showing resolution according to the pixel arrangement in FIG. 13.
Figure 17:
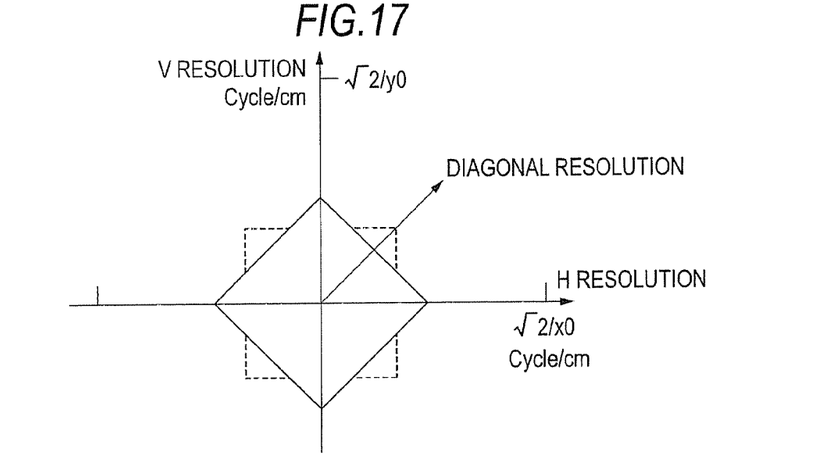
FIG. 17 is an explanatory diagram showing resolution according to the pixel arrangement in FIG. 14.

For example, FIGS. 16 and 17 are explanatory diagrams showing two-dimensional resolution when three primary colors of RGB are considered as one set of pixel groups 7 and the respective pixel groups 7 are controlled according to the sampling of an image (hereinafter, referred to as pixel control) in FIGS. 14 and 15, respectively.

In FIG. 14, the horizontal sampling frequency corresponds to x0 (the vertical sampling frequency is y0). According to the sampling theorem, the maximum frequency restorable when the sampling frequency is x0 is expressed by 1/2x0. In the vertical direction, similarly, the restorable maximum frequency is expressed by 1/2y0. FIG. 16 two-dimensionally shows the relationship.

FIG. 17 showing the resolution corresponding to FIG. 15 is obtained by rotating FIG. 16 to 45° and has the same area as FIG. 16. In FIG. 17, the broken line area corresponds to the resolution of FIG. 14 (FIG. 16) shown for comparison to the resolution of FIG. 15. The areas showing the resolution have the same area in FIGS. 16 and 17 because the numbers of pixels are the same in FIGS. 14 and 15. Assuming that the horizontal pixel pitch of FIG. 14 is x0, components reduced to $x0/\sqrt{2}$ appear in horizontal and vertical components in FIG. 15. In FIG. 17, although the resolution of diagonal line is sacrificed, the horizontal and vertical resolution becomes higher according to the components reduced to $x0/\sqrt{2}$ of the pixel pitch. Here, in nature of image, generally, the resolution component of diagonal line is insufficient compared to the horizontal and vertical resolution components. Therefore, improvement in horizontal and vertical resolution at the expense of the resolution component of diagonal line makes the apparent resolution of the image being displayed higher and provides improvement in image quality.

Further, the lattice-shaped space areas 9 in FIG. 14, from which one subpixel has been removed and which may be noticeable through observation at close range, are arranged in a staggered manner in FIG. 15 and becomes less noticeable as noise.

Figure 18:
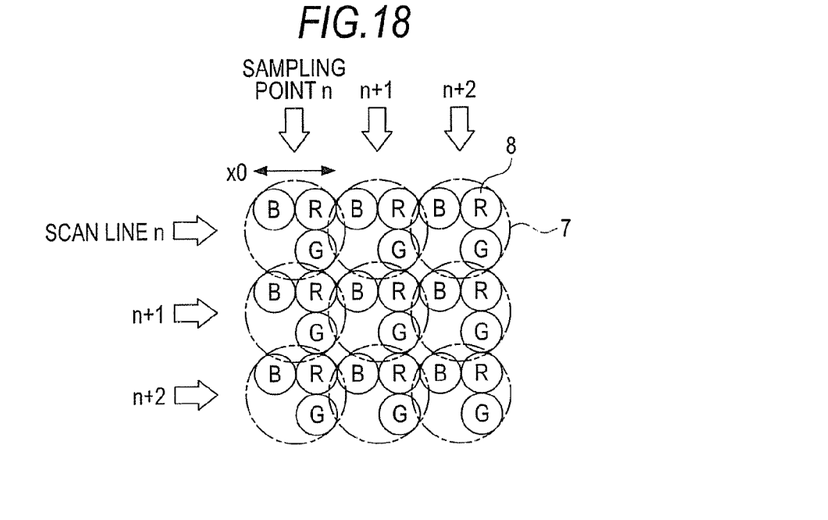
FIG. 18 is an explanatory diagram of pixel control in embodiment 3 of the invention.
Figure 19:
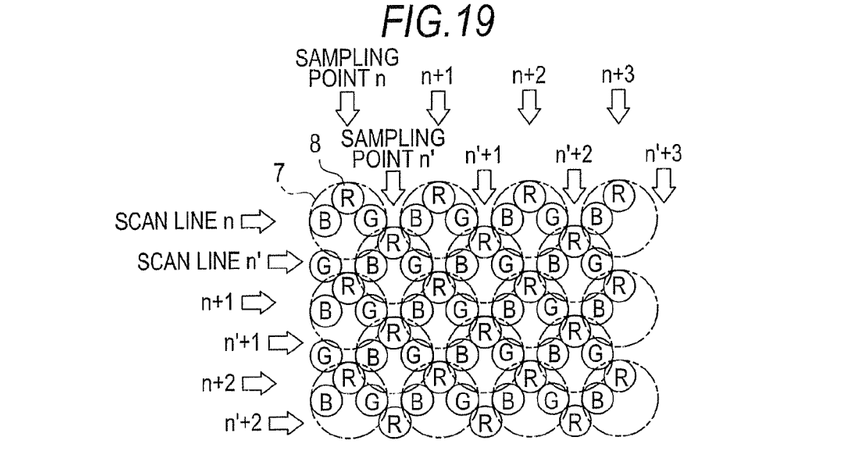
FIG. 19 is an explanatory diagram of pixel control in embodiment 4 of the invention.

FIGS. 18 and 19 are explanatory diagrams showing a concept of the pixel control corresponding to FIGS. 14 and 15, and each pixel group 7 corresponds to one sampling point of an image.

In FIG. 18, the light emitting elements 8 of each pixel are sequentially controlled based on image signals sampled at sampling points n, n+1, n+2, . . . corresponding to the respective pixels in lines of scan lines n, n+1, n+2, . . . .

In FIG. 19, the light emitting elements 8 of each pixel along odd-numbered lines are sequentially controlled based on image signals sampled at sampling points n, n+1, n+2, . . . corresponding to the respective pixels rotated to 45° in lines of odd-numbered scan lines n, n+1, n+2, . . . , and the light emitting elements 8 of each pixel along even-numbered lines are sequentially controlled based on image signals sampled at sampling points n', n'+1, n'+2, . . . corresponding to the respective pixels rotated to 45° in lines of even-numbered scan lines n', n'+1, n'+2, . . . .

As described above, according to embodiment 4 of the invention, since the pixel groups 7 are rotated to 45° relative to the center point of the square lattice in the display unit 3 and the pixel groups 7 are arranged in a staggered manner as a whole, the image degradation can be further reduced and the cost reduction of light emitting elements can be effectively realized.

Embodiment 5

Figure 20:
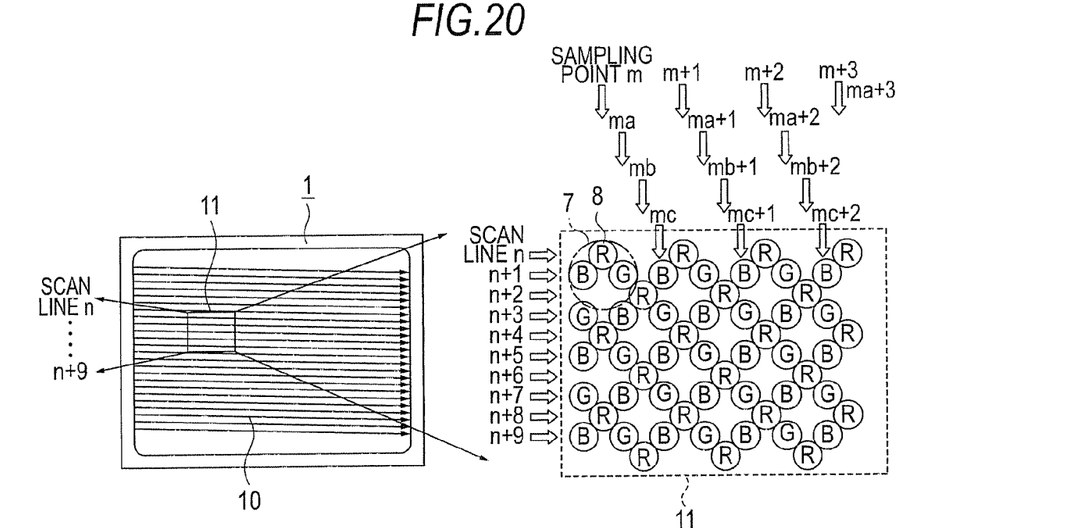
FIG. 20 is a schematic explanatory diagram showing an image display device in embodiment 5 of the invention.

FIG. 20 is a schematic explanatory diagram showing an image display device in embodiment 5 of the invention.

In FIG. 20, image signals displayed on the image display device 1 are provided as many scan lines 10. In the image display device 1, when attention is focused on a micro area 11 corresponding to scan lines n to n+9, the pixel groups 7 shown in embodiment 4 are arranged therein. The image signals corresponding to light emitting elements 8 of the respective colors of R, G, B forming the pixel groups 7 are separately sampled according to the spatial locations of the respective light emitting elements (subpixels) 9, and the respective light emitting elements (subpixels) 9 are driven.

For example, each scan line 10 contains color signals of three primary colors, and, in the line of scan line n, R signals are extracted and the respective R light emitting elements 8 are controlled based on the image signals sampled at sampling points of m, m+1, m+2, m+3, . . . corresponding to R. In the line of scan line n+1, G and B signals are extracted and the respective G and B light emitting elements 8 are controlled based on the image signals sampled at sampling points of ma, mc, ma+1, mc+1, ma+2, mc+2, ma+3, mc+3, . . . corresponding to G and B. Similarly, in the lines of scan lines n+2 and n+3, the respective corresponding light emitting elements 8 are controlled based on the image signals sampled at sampling points of mb, mb+1, mb+2, mb+3, . . . and ma, mc, ma+1, mc+1, ma+2, mc+2, ma+3, mc+3, . . . , respectively.

Such a method of controlling the image signals of the respective colors based on signals sampled according to spatial locations of the individual subpixels is referred to as subpixel control in distinction from pixel control.

Figure 21:
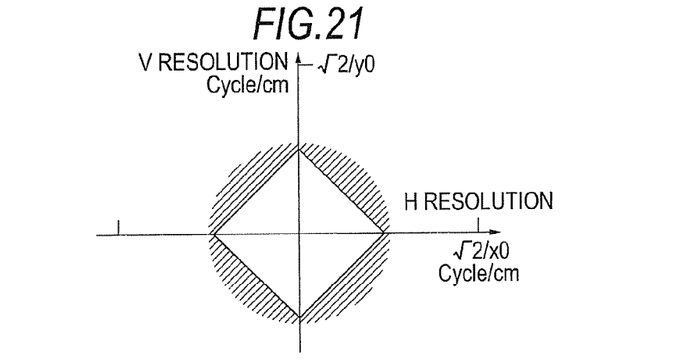
FIG. 21 is an explanatory diagram of resolution in the image display device in FIG. 20.

FIG. 21 is an explanatory diagram showing a concept of resolution in embodiment 5 of the invention. The resolution chart FIG. 17 of pixel control defined according to pixel arrangement in FIG. 15 represents resolution common among three colors, and full-color display can be performed. Here, when subpixel control is applied to the pixel arrangement in FIG. 15, the sampling points of the image increase threefold and apparent resolution becomes higher according to the increase of sampling points.

The improvement in apparent resolution according to subpixel control can be qualitatively represented as an area (shaded part) surrounding the areas representing the resolution common among three colors as shown in FIG. 21. Since information is representatively borne by one of R, G, B in the area, the area tends to change its color to the color of the subpixel bearing the information. Although full-color representation is impossible, the area is important in improvement in resolution because the human vision is more sensitive to contrast than colors and ignores the color change in details.

As described above, in embodiment 5 of the invention, by applying the subpixel control in addition to the effect of removing subpixels by the method that can suppress the image degradation, image quality can be improved and cost reduction in the image display device can be extremely effectively realized.

Embodiment 6

Figure 22:
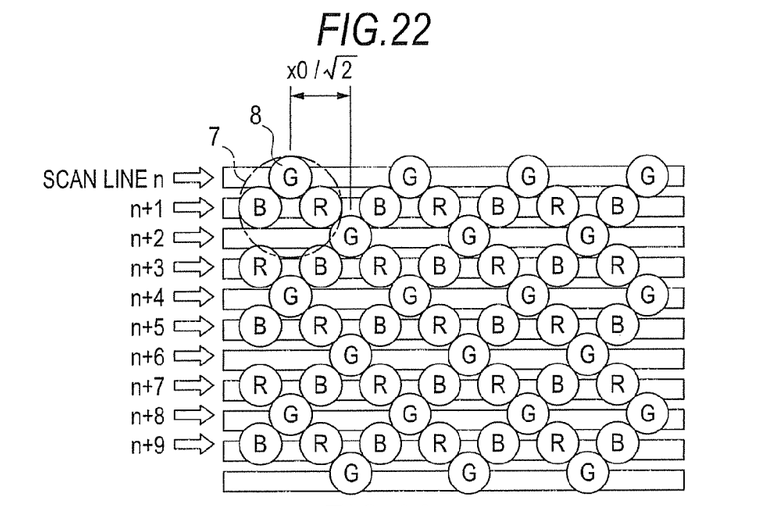
FIG. 22 is an explanatory diagram showing pixel arrangement of each display unit in embodiment 6 of the invention.

FIG. 22 shows pixel arrangement in each display unit 3 in embodiment 6 of the invention. In the pixel group 7 of the embodiment 3 (FIG. 14) and the embodiment 4 (FIG. 15), the subpixels are arranged to form a triangle and the apex of the triangle is R. On the other hand, in FIG. 22, G is located on the apex of the triangle.

The scan lines in FIG. 20 include the odd-numbered lines (n, n+2, n+4 . . . ) corresponding to R and the even-numbered lines (n+1, n+3, n+5, . . . ) corresponding to B and G. Generally, G dominates 60% of the brightness, and there are large brightness differences between odd-numbered lines and even-numbered lines of the scan lines in FIG. 20.

On the other hand, in FIG. 22, the scan lines include the odd-numbered lines (n, n+2, n+4 . . . ) corresponding to G and the even-numbered lines (n+1, n+3, n+5, . . . ) corresponding to B and R. Consequently, there are advantages that the brightness differences between odd-numbered lines and even-numbered lines of the scan lines become smaller and flickers due to brightness differences between lines during moving image display become less noticeable in subpixel control.

As described above, in embodiment 6 of the invention, by applying the subpixel control in addition to the effect of removing subpixels by the method that can suppress the image degradation, image quality can be improved and cost reduction in the image display device can be extremely effectively realized.

As further characterized in embodiment 6, when the subpixel control is applied, the colors of scan lines are in the complementary color relation with odd-numbered lines of G and even-numbered lines of B and R. This relation similarly holds in the longitudinal and lateral lines and the adjacent lines are in the complementary color relation. That is, the adjacent lines make up for deficiency of colors in the respective lines necessary for white representation. As described in embodiment 5, details of the image tend to change their colors to the colors of subpixels bearing information, however, the color change tends to be reduced when images move. The tendency is common in the embodiments 3 to 6 of the invention.

Embodiment 7

Figure 23:
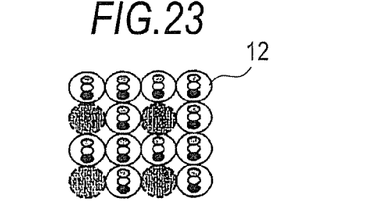
FIG. 23 is an explanatory diagram showing an example of pixel arrangement of each display unit in embodiment 7 of the invention.
Figure 24:
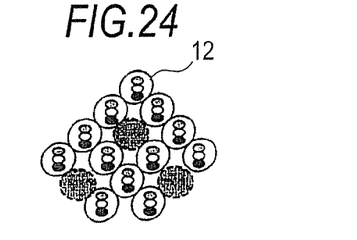
FIG. 24 is an explanatory diagram showing another example of pixel arrangement of each display unit in embodiment 7 of the invention.
Figure 25:
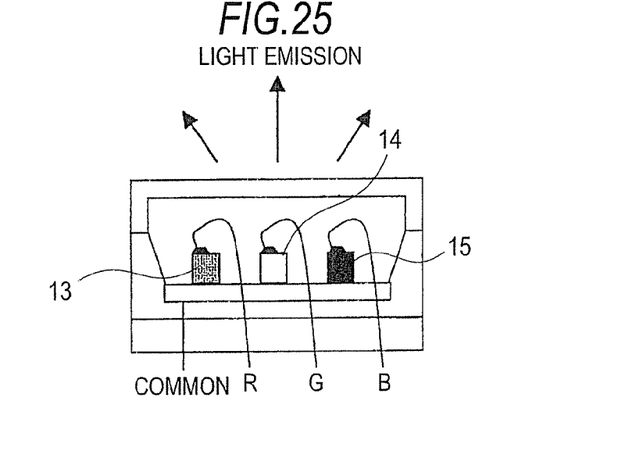
FIG. 25 is an explanatory diagram showing an example of an LED device of 3-in-1 system used for embodiment 7.

FIGS. 23, 24 are explanatory diagrams showing pixel arrangement of a display unit according to embodiment 7 of the invention. FIG. 24 is an explanatory diagram showing an example using an LED device 12 of 3-in-1 system in place of the light emitting elements 8 of the display unit 3 in embodiment 3 of the invention, and FIG. 25 is an explanatory diagram showing an example using an LED device 12 of 3-in-1 system in place of the light emitting elements 8 of the display unit 3 in embodiment 4 of the invention.

Figure 26:
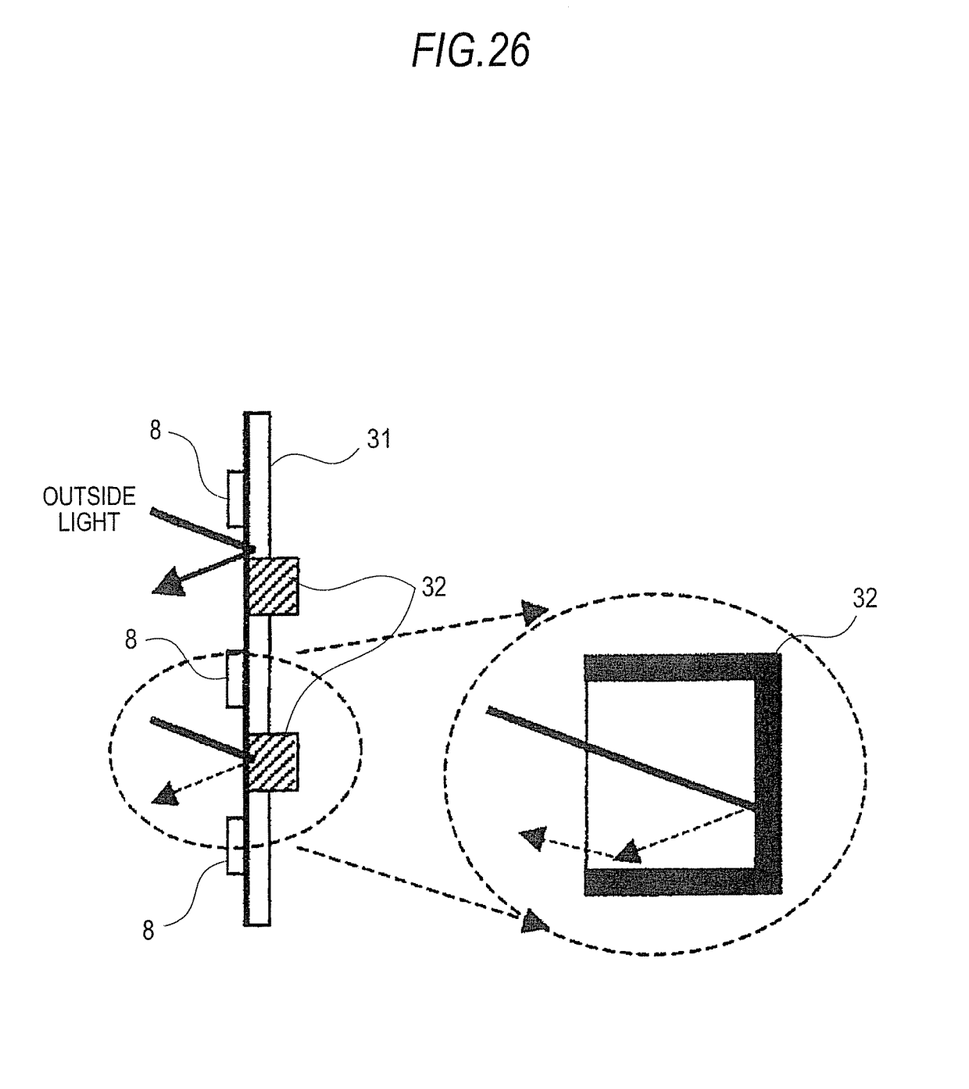
FIG. 26 is a sectional view of a main part showing a display unit of embodiment 8 of the invention.

The LED device 12 of 3-in-1 system includes LED chips 13, 14, 15 of three primary colors of R, G, B in one LED lamp as shown in FIG. 26 and R, G, B are concentrated on one point. When the device is used as the light emitting element 8 of the display unit 3, one pixel emits light of three primary colors and the unit can be applied to a full-color display device. The resolution is the same as that in FIGS. 11 and 13, and the respective resolution represents the full-color resolution.

Embodiment 8

In the embodiments 3 to 7, a space area 9 is formed by removing one pixel from four (2×2) pixels forming a square lattice. When the space is blackened, the black level of the display surface becomes lower and the contrast of the image can be improved. On the other hand, when direct sunlight is received, the reflection of outside light from the black area is not negligible and the contrast may be lowered. Here, by providing an opening member forming a recessed part on the display surface in the space area that has been formed by removing one pixel, application and reflection of outside light are suppressed and the contrast is improved.

FIG. 26 is a sectional view of a main part showing a display unit 3 of embodiment 8, and shows a section along A-A line in FIG. 15. Light emitting elements 8 such as LEDs are mounted on a substrate 31 of the display unit 3, and the surface of the substrate 31 is blackened by a resin coating or the like. A certain degree of reflection can be suppressed by blackening the space area 9, and, when opening members 32 forming recessed parts are provided on the display surface in the space areas 9 and also the interiors of the opening members 32 are blackened, in application of direct sunlight, the reflection of outside light that has once entered the recessed parts is significantly suppressed and the contrast is remarkably improved.

Various modifications and alterations of this invention will be apparent to those skilled in the art without departing from the scope and spirit of this invention, and it should be understood that this is not limited to the illustrative embodiments set forth herein.

What is claimed is:

1. An image display device in which plural display units are arranged in a plane, the display unit configured by two-dimensionally arranging lattice-shaped pixel groups formed by providing pixels in locations corresponding to three lattice points of a square lattice, respectively, and forming a space area in which no pixel exists in a location corresponding to the remaining lattice point, and providing an opening member forming a recessed part on a display surface in the space area,
    wherein the pixels are rotated 45° relative to the center point of the square lattice so that the pixels may be arranged in a staggered manner as a whole, and
    the space area is blackened.

2. The image display device according to claim 1, wherein light emitting elements of three primary colors of R, G, and B are provided in the locations corresponding to the three lattice points of the square lattice, respectively.

3. The image display device according to claim 2, wherein image signals corresponding to the light emitting elements of the three primary colors of R, G, B are separately sampled according to spatial locations of the respective colors, and the light emitting elements of the respective colors are driven based on the sampled signals.

4. The image display device according to claim 3, wherein the light emitting elements of the pixels are located so that the light emitting elements of the primary color G may be scanned by odd-numbered or even-numbered lines of scan lines and the light emitting elements of the primary colors B and R may be scanned by even-numbered or odd-numbered lines of scan lines in the display unit.

5. The image display device according to claim 1, wherein LED devices of 3-in-1 system including LED chips of three colors of R, G, and B in one LED lamp are provided in the locations corresponding to the three lattice points of the square lattice, respectively.

6. An display unit for image display device configured by two-dimensionally arranging lattice-shaped pixel groups formed by providing pixels in locations corresponding to three lattice points of a square lattice, respectively, and forming a space area in which no pixel exists in a location corresponding to the remaining lattice point, and providing an opening member forming a recessed part on a display surface in the space area,
    wherein the pixels are rotated to 45° relative to the center point of the square lattice so that the pixels may be arranged in a staggered manner as a whole, and
    the space area is blackened.

7. The image display unit according to claim 6, wherein light emitting elements of three primary colors of R, G, and B are provided in the locations corresponding to the three lattice points of the square lattice, respectively.

8. The image display unit according to claim 6, wherein LED devices of 3-in-1 system including LED chips of three colors of R, G, and B in one LED lamp are provided in the locations corresponding to the three lattice points of the square lattice, respectively.

* * * * *